United States Patent
Murphy

[11] Patent Number: 6,139,041
[45] Date of Patent: Oct. 31, 2000

[54] TRAILER HITCHING ALIGNMENT AID

[76] Inventor: Joseph G. Murphy, 364 E. 3rd North, Green River, Wyo. 82935

[21] Appl. No.: 09/292,580

[22] Filed: Apr. 15, 1999

[51] Int. Cl.$^7$ .................................................. B60D 1/40
[52] U.S. Cl. .............................................. 280/477; 33/264
[58] Field of Search .................................. 280/477, 504, 280/511; 116/28 R; 33/264, 286, 293; D12/162

[56] References Cited

U.S. PATENT DOCUMENTS

| 3,015,162 | 1/1962 | Bohnet | 280/477 |
|---|---|---|---|
| 3,720,000 | 3/1973 | Schlegel | 280/477 |
| 3,774,149 | 11/1973 | Bennett | 280/477 |
| 4,012,056 | 3/1977 | Christensen | 280/477 |
| 4,666,176 | 5/1987 | Sand | 280/477 |
| 6,042,136 | 3/2000 | Heinecke | 280/477 |

FOREIGN PATENT DOCUMENTS

| 2069430 | 8/1981 | United Kingdom | 280/477 |
|---|---|---|---|
| 2086325 | 8/1981 | United Kingdom | 280/477 |

Primary Examiner—Daniel G. DePumpo

[57] ABSTRACT

A trailer hitching alignment aid for helping a driver of a vehicle properly align the vehicle's hitch with the trailer tongue of the trailer. The trailer hitching alignment aid includes a vehicle mounted assembly designed for mounting to a vehicle above a ball hitch of the vehicle and a trailer mounted assembly designed for mounting to a trailer tongue of a trailer. The vehicle mounted assembly comprises a main member and an elongate end member coupled to the main member. The end member is designed for coupling to the vehicle such that the main member is positioned above the ball hitch of the vehicle. An elongate first guide rod is upwardly extended the main member. The trailer mounted assembly comprises an upper member and a lower member having a top portion coupled to a lower end of the upper member. An upwardly facing trailer magnet is coupled to a bottom portion of the lower member. A center extent upwardly extends from a center region of the trailer magnet. The center extent is designed for insertion into the receiving socket of the trailer tongue of the trailer so that the trailer magnet may magnetically couple the bottom portion of the lower member to the trailer tongue of the trailer. An elongate second guide rod is upwardly extended from the upper end of the upper member. A light source is coupled to an upper end of the second guide rod. A switch is electrically connected to the light source and has an elongate actuator downwardly extending from the bottom portion of the lower member. The longitudinal axis of the second guide rod and the actuator of the switch are coaxially aligned with one another.

8 Claims, 2 Drawing Sheets

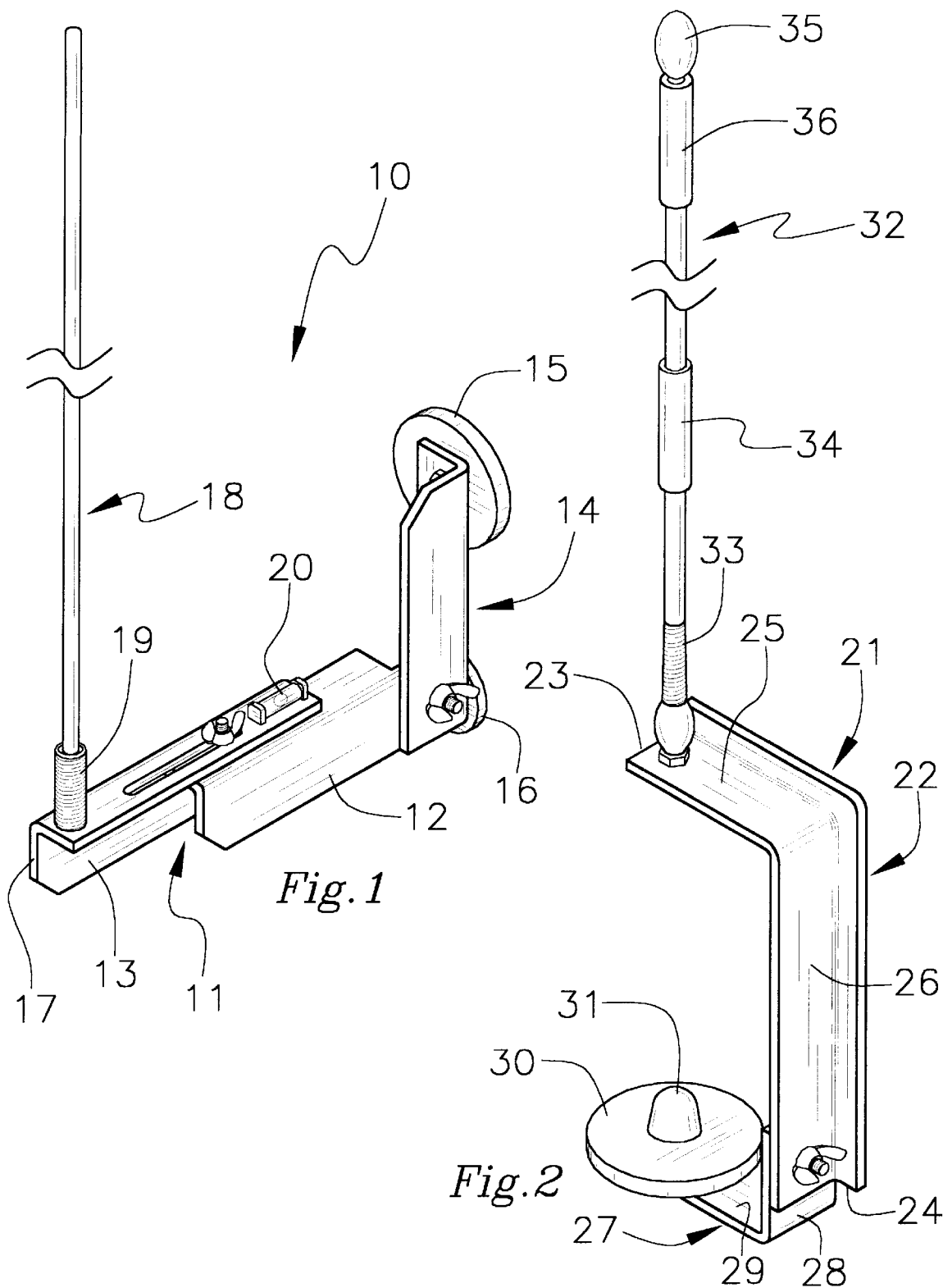

TRAILER HITCHING ALIGNMENT AID

BACKGROUND OF THE INVENTION

1. Field of the Invention

The present invention relates to trailer hitching alignment aids and more particularly pertains to a new trailer hitching alignment aid for helping a driver of a vehicle properly align the vehicle's hitch with the trailer tongue of the trailer.

2. Description of the Prior Art

The use of trailer hitching alignment aids is known in the prior art. More specifically, trailer hitching alignment aids heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,335,930; U.S. Pat. No. 3,966,231; U.S. Pat. No. 4,169,610; U.S. Pat. No. 5,558,352; U.S. Pat. No. 5,669,621; and U.S. Pat. No. Des. 331,900.

While these devices fulfill their respective, particular objectives and requirements, the aforementioned patents do not disclose a new trailer hitching alignment aid. The inventive device includes a vehicle mounted assembly designed for mounting to a vehicle above a ball hitch of the vehicle and a trailer mounted assembly designed for mounting to a trailer tongue of a trailer. The vehicle mounted assembly comprises a main member and an elongate end member coupled to the main member. The end member is designed for coupling to the vehicle such that the main member is positioned above the ball hitch of the vehicle. An elongate first guide rod is upwardly extended the main member. The trailer mounted assembly comprises an upper member and a lower member having a top portion coupled to a lower end of the upper member. An upwardly facing trailer magnet is coupled to a bottom portion of the lower member. A center extent upwardly extends from a center region of the trailer magnet. The center extent is designed for insertion into the receiving socket of the trailer tongue of the trailer so that the trailer magnet may magnetically couple the bottom portion of the lower member to the trailer tongue of the trailer. An elongate second guide rod is upwardly extended from the upper end of the upper member. A light source is coupled to an upper end of the second guide rod. A switch is electrically connected to the light source and has an elongate actuator downwardly extending from the bottom portion of the lower member. The longitudinal axis of the second guide rod and the actuator of the switch are coaxially aligned with one another.

In these respects, the trailer hitching alignment aid according to the present invention substantially departs from the conventional concepts and designs of the prior art, and in so doing provides an apparatus primarily developed for the purpose of helping a driver of a vehicle properly align the vehicle's hitch with the trailer tongue of the trailer.

SUMMARY OF THE INVENTION

In view of the foregoing disadvantages inherent in the known types of trailer hitching alignment aids now present in the prior art, the present invention provides a new trailer hitching alignment aid construction wherein the same can be utilized for helping a driver of a vehicle properly align the vehicle's hitch with the trailer tongue of the trailer.

The general purpose of the present invention, which will be described subsequently in greater detail, is to provide a new trailer hitching alignment aid apparatus and method which has many of the advantages of the trailer hitching alignment aids mentioned heretofore and many novel features that result in a new trailer hitching alignment aid which is not anticipated, rendered obvious, suggested, or even implied by any of the prior art trailer hitching alignment aids, either alone or in any combination thereof.

To attain this, the present invention generally comprises a vehicle mounted assembly designed for mounting to a vehicle above a ball hitch of the vehicle and a trailer mounted assembly designed for mounting to a trailer tongue of a trailer. The vehicle mounted assembly comprises a main member and an elongate end member coupled to the main member. The end member is designed for coupling to the vehicle such that the main member is positioned above the ball hitch of the vehicle. An elongate first guide rod is upwardly extended the main member. The trailer mounted assembly comprises an upper member and a lower member having a top portion coupled to a lower end of the upper member. An upwardly facing trailer magnet is coupled to a bottom portion of the lower member. A center extent upwardly extends from a center region of the trailer magnet. The center extent is designed for insertion into the receiving socket of the trailer tongue of the trailer so that the trailer magnet may magnetically couple the bottom portion of the lower member to the trailer tongue of the trailer. An elongate second guide rod is upwardly extended from the upper end of the upper member. A light source is coupled to an upper end of the second guide rod. A switch is electrically connected to the light source and has an elongate actuator downwardly extending from the bottom portion of the lower member. The longitudinal axis of the second guide rod and the actuator of the switch are coaxially aligned with one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitching alignment aid apparatus and method which has many of the advantages of the trailer hitching alignment aids mentioned heretofore and many novel features that result in a new trailer hitching alignment aid which is not anticipated, rendered obvious, suggested, or even implied by any of the prior art trailer hitching alignment aids, either alone or in any combination thereof.

It is another object of the present invention to provide a new trailer hitching alignment aid which may be easily and efficiently manufactured and marketed.

It is a further object of the present invention to provide a new trailer hitching alignment aid which is of a durable and reliable construction.

An even further object of the present invention is to provide a new trailer hitching alignment aid which is susceptible of a low cost of manufacture with regard to both materials and labor, and which accordingly is then susceptible of low prices of sale to the consuming public, thereby making such trailer hitching alignment aid economically available to the buying public.

Still yet another object of the present invention is to provide a new trailer hitching alignment aid which provides in the apparatuses and methods of the prior art some of the advantages thereof, while simultaneously overcoming some of the disadvantages normally associated therewith.

Still another object of the present invention is to provide a new trailer hitching alignment aid for helping a driver of a vehicle properly align the vehicle's hitch with the trailer tongue of the trailer.

Yet another object of the present invention is to provide a new trailer hitching alignment aid which includes a vehicle mounted assembly designed for mounting to a vehicle above a ball hitch of the vehicle and a trailer mounted assembly designed for mounting to a trailer tongue of a trailer. The vehicle mounted assembly comprises a main member and an elongate end member coupled to the main member. The end member is designed for coupling to the vehicle such that the main member is positioned above the ball hitch of the vehicle. An elongate first guide rod is upwardly extended the main member. The trailer mounted assembly comprises an upper member and a lower member having a top portion coupled to a lower end of the upper member. An upwardly facing trailer magnet is coupled to a bottom portion of the lower member. A center extent upwardly extends from a center region of the trailer magnet. The center extent is designed for insertion into the receiving socket of the trailer tongue of the trailer so that the trailer magnet may magnetically couple the bottom portion of the lower member to the trailer tongue of the trailer. An elongate second guide rod is upwardly extended from the upper end of the upper member. A light source is coupled to an upper end of the second guide rod. A switch is electrically connected to the light source and has an elongate actuator downwardly extending from the bottom portion of the lower member. The longitudinal axis of the second guide rod and the actuator of the switch are coaxially aligned with one another.

Still yet another object of the present invention is to provide a new trailer hitching alignment aid that provides a visual alignment guide to let a driver of a vehicle determine when the hitch of the vehicle and the trailer tongue of a trailer are aligned with one another to permit coupling of the trailer to the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the vehicle mounted assembly of a new trailer hitching alignment aid according to the present invention.

FIG. 2 is a schematic perspective view of the trailer mounted assembly of the present invention.

DESCRIPTION OF THE PREFERRED EMBODIMENT

Figure 3:
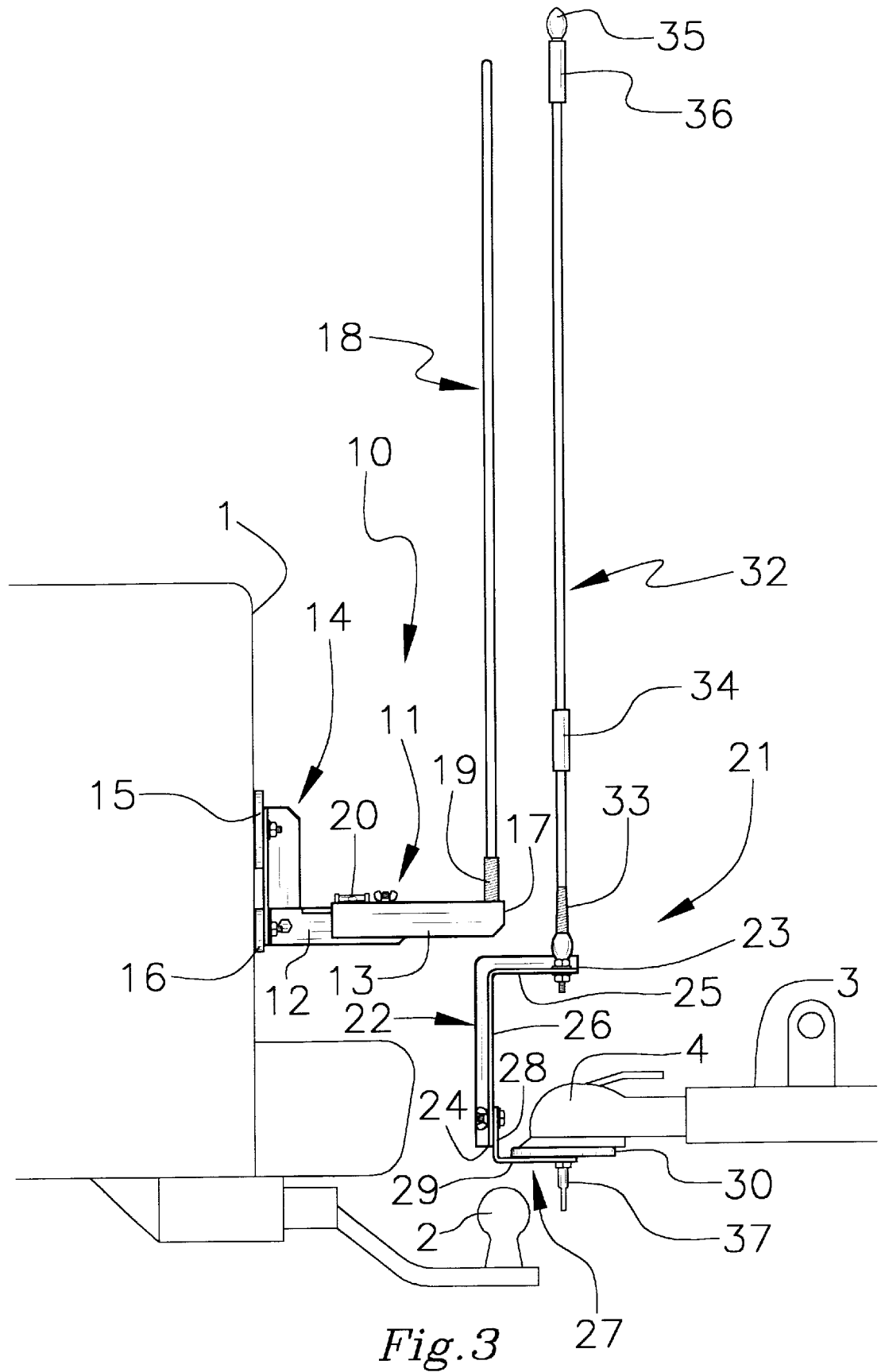
FIG. 3 is a schematic side view of the present invention in use to align the ball hitch of a vehicle with the receiving socket of the trailer tongue of a vehicle.

With reference now to the drawings, and in particular to FIGS. 1 through 3 thereof, a new trailer hitching alignment aid embodying the principles and concepts of the present invention will be described.

As best illustrated in FIGS. 1 through 3, the trailer hitching alignment aid generally comprises a vehicle mounted assembly designed for mounting to a vehicle above a ball hitch of the vehicle and a trailer mounted assembly designed for mounting to a trailer tongue of a trailer. The vehicle mounted assembly comprises a main member and an elongate end member coupled to the main member. The end member is designed for coupling to the vehicle such that the main member is positioned above the ball hitch of the vehicle. An elongate first guide rod is upwardly extended the main member. The trailer mounted assembly comprises an upper member and a lower member having a top portion coupled to a lower end of the upper member. An upwardly facing trailer magnet is coupled to a bottom portion of the lower member. A center extent upwardly extends from a center region of the trailer magnet. The center extent is designed for insertion into the receiving socket of the trailer tongue of the trailer so that the trailer magnet may magnetically couple the bottom portion of the lower member to the trailer tongue of the trailer. An elongate second guide rod is upwardly extended from the upper end of the upper member. A light source is coupled to an upper end of the second guide rod. A switch is electrically connected to the light source and has an elongate actuator downwardly extending from the bottom portion of the lower member. The longitudinal axis of the second guide rod and the actuator of the switch are coaxially aligned with one another.

The alignment aid is designed for use with a vehicle 1 having an upwardly extending ball hitch 2 coupled thereto and a trailer having a trailer tongue 3 with a downwardly facing ball hitch receiving socket 4 therein designed for receiving the ball hitch therein to permit coupling of the trailer to the vehicle. In use, the alignment aid is allows a driver of the vehicle to align the ball hitch with the receiving socket as the driver backs the vehicle towards the trailer.

Specifically, the alignment aid comprises a vehicle mounted assembly and a trailer mounted assembly. With reference to FIG. 1, the vehicle mounted assembly 10 comprises an adjustably extendable elongate main member 11 having elongate proximal and distal portions 12,13. The distal portion of the main member slidably coupled to the proximal portion of the main member preferably by an elongate slot and fastener combination to permit sliding of the distal portion of the main member with respect to the proximal portion of the main member. This allows sliding of the distal portion of the main member in a first direction to extend the length of the main member and sliding of the distal portion in a second direction opposite the first direction to retract the length of the main member.

The vehicle mounted assembly also includes an elongate end member 14 having a pair of opposite ends. A lower end of the pair of ends of the end member are pivotally coupled to the proximal portion of the main member preferably by a threaded fastener and nut combination to permit fixing of the position of the end member with respect to the main member. In an ideal embodiment, the proximal and distal portions of the main member and end member each have a generally L-shaped transverse cross section for enhancing their structural rigidity.

A pair of generally disk shaped vehicle magnets 15,16 are coupled to the end member and facing away from the main member. One of the vehicle magnets is positioned adjacent the lower end of the end member and the other of the vehicle magnets is positioned adjacent an upper end of the pair of ends of the end member. The vehicle magnet 15 adjacent the upper end of the end member preferably has a larger outer diameter than the vehicle magnet 16 adjacent the lower end of the end member. The vehicle magnets magnetically couple the end member to the to the vehicle such that the main member is outwardly extended from the vehicle above the ball hitch of the vehicle.

The distal portion of the main member has a distal end 17 opposite the proximal portion of the main member. The distal end of the distal portion is positioned directly above the ball hitch of the vehicle when the vehicle mounted assembly is mounted to the vehicle.

An elongate first guide'rod is upwardly extended substantially perpendicularly from the distal end of the distal portion of the main member. The first guide rod has opposite upper and lower ends and a longitudinal axis extending between the upper and lower ends of the first guide rod. The lower end of the first guide rod is coupled to the distal end of the distal portion of the main member. The longitudinal axis of the first guide rod is extended substantially vertical and the first guide rod is upwardly extended to a point where the upper end of the first guide rod is visible to a driver of the vehicle preferably by viewing in the rear view mirror of the vehicle.

Preferably, the first guide rod has a resiliently deflectable region adjacent the lower end of the first guide rod to permit resilient deflection of the first guide rod therein. The resiliently deflectable region of the first guide rod ideally comprises a resiliently deflectable spring.

Preferably, a bubble vial level indicator 20 is coupled to the main member. The level indicator is aligned on the main member for providing a visual indication of the horizontal levelness of the main member when mounted to the vehicle.

Turning to FIG. 2, the trailer mounted assembly 21 of the trailer alignment aid comprises an inverted generally L-shaped upper member 22 having upper and lower ends 23,24, and elongate upper and lower portions 25,26 extending substantially perpendicular to one another. The upper portion of the upper member is positioned adjacent the upper end of the upper member. The lower portion of the upper member is positioned adjacent the lower end of the upper member. Ideally, the upper and lower portions of the upper member each has a generally L-shaped transverse cross section for enhancing their structural rigidity.

The trailer mounted assembly also includes a generally L-shaped lower member 27 having elongate top and bottom portions 28,29 extending substantially perpendicular to one another. The top portion of the lower member is coupled to the lower end of the upper member preferably by a threaded fastener and nut combination. The upper portion of the upper member is positioned directly above the bottom portion of the lower member so that the upper and lower members form a generally C-shaped configuration. The upper portion of the upper member and the bottom portion of the lower member are preferably extended substantially parallel to one another.

An upwardly facing generally disk-shaped trailer magnet 30 is coupled to the bottom portion of the lower member. A generally dome-shaped center extent 31 upwardly extends from a center region of the trailer magnet. The center extent is designed for coaxially aligning the trailer mounted assembly with the receiving socket of the trailer tongue of the trailer.

In use, the center extent is inserted into the receiving socket of the trailer tongue of the trailer. This allows the trailer magnet to magnetically couple the bottom portion of the lower member to the trailer tongue of the trailer. When the trailer mounted assembly is mounted to the trailer tongue, the lower portion of the upper member is positioned in front of the trailer tongue of the trailer and the upper portion of the upper member is positioned directly above the receiving socket of the trailer tongue of the trailer. As best illustrated in FIG. 3, in use, the upper portion of the upper member is located at an elevation with respect to a ground surface below an elevation above the ground surface at which the main member of the vehicle mounted assembly is located.

An elongate second guide rod 32 is upwardly extended substantially perpendicularly from the upper end of the upper member. The second guide rod has opposite upper and lower ends and a longitudinal axis extending between the upper and lower ends of the second guide rod. The lower end of the second guide rod is coupled to the upper end of the upper member. The longitudinal axis of the second guide rod is extended substantially vertical with the second guide rod upwardly extended to a point where the upper end of the second guide rod is visible to a driver of the vehicle (preferably by viewing in the rear view mirror of the vehicle).

Ideally, the second guide rod has a resiliently deflectable region 33 located adjacent the lower end of the second guide rod to permit resilient deflection of the second guide rod therein. Like the first guide rod, preferably, the resiliently deflectable region of the second guide rod comprises a resiliently deflectable spring.

Preferably, a tubular generally cylindrical guide sleeve 34 is slidably disposed around the second guide member to permit sliding of the guide sleeve up and down along the second guide rod. The guide sleeve is designed for aiding the setting of the elevation of the ball hitch before backing under the trailer tongue.

A light source 35 is coupled to the upper end of the second guide rod. Ideally, the light source comprises an incandescent light bulb. The light source is preferably located at an elevation viewable to the driver of the vehicle. A battery power source is electrically connected to the light source for providing electrical energy for illuminating the light source. The battery power source is disposed in a generally cylindrical compartment 36 located at the upper end of the second guide rod below the light source.

A switch is disposed in the center extent and is electrically connected to the light source. The switch has an elongate actuator 37 downwardly extending from the bottom portion of the lower member through a hole in the bottom portion of the lower member. The longitudinal axis of the second guide rod, the actuator of the switch, and the center extent are coaxially aligned with one another so that the second guide rod accurately reflects the position of the receiving socket of the trailer tongue to the driver of the vehicle. In use, the switch sends a signal to the light source when the ball hitch of the vehicle comes into contact with the actuator to deflect the actuator when the ball hitch is positioned adjacent the receiving socket of the trailer tongue. The light source is illuminated upon receipt of the signal from the switch to provide a visual indicator to the driver of the vehicle that the ball hitch is positioned adjacent the receiving socket.

To mount the assemblies properly, the trailer mounted assembly is rested on the ground surface adjacent the ball hitch of the vehicle with the second guide rod extending vertically upwards. The guide sleeve is slid along the second guide rod until the bottom of the guide sleeve is aligned with the top of the ball hitch. The trailer mounted assembly is then attached to the trailer tongue of the trailer. The trailer is then raised or lowered until the top of the guide sleeve is aligned with the top of the ball hitch. The vehicle mounted assembly is then attached to the vehicle above the ball hitch. The vehicle is then backed up with the driver keeping the guide rods in line with one another until the light source is illuminated indicating that the ball hitch is positioned below the receiving socket.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An alignment aid for aligning a ball hitch of a vehicle with a receiving socket of a trailer tongue of a trailer, said alignment aid comprising:
   a vehicle mounted assembly adapted for mounting to a vehicle above a ball hitch of the vehicle and a trailer mounted assembly adapted for mounting to a trailer tongue of a trailer;
   said vehicle mounted assembly comprising:
      a main member;
      an elongate end member being coupled to said main member;
      said end member being adapted for coupling to the vehicle such that said main member is positioned above the ball hitch of the vehicle;
      an elongate first guide rod being upwardly extended said main member;
   said trailer mounted assembly comprising:
      an upper member having upper and lower ends;
      a lower member having top and bottom portions;
      said top portion of said lower member being coupled to said lower end of said upper member;
      an upwardly facing trailer magnet being coupled to said bottom portion of said lower member;
      a center extent upwardly extending from a center region of said trailer magnet;
      said center extent being adapted for insertion into said receiving socket of said trailer tongue of said trailer, said trailer magnet being adapted for magnetically coupling said bottom portion of said lower member to said trailer tongue of said trailer;
      an elongate second guide rod being upwardly extended from said upper end of said upper member;
      a light source being coupled to an upper end of said second guide rod;
      a switch being electrically connected to said light source and having an elongate actuator downwardly extending from said bottom portion of said lower member; and
      said longitudinal axis of said second guide rod and said actuator of said switch being coaxially aligned with one another.

2. The alignment aid of claim 1, wherein said main member has elongate proximal and distal portions, wherein said distal portion of said main member is slidably coupled to said proximal portion of said main member.

3. The alignment aid of claim 1, further comprising a pair of vehicle magnets being coupled to said end member and facing away from said main member, wherein said vehicle magnets are adapted for magnetically coupling said end member to the vehicle such that said main member is outwardly extended from the vehicle above the ball hitch of the vehicle.

4. The alignment aid of claim 1, wherein said guide rods each have a resiliently deflectable region adjacent said lower end of the respective guide rod.

5. The alignment aid of claim 1, further comprising a level indicator being coupled to said main member.

6. The alignment aid of claim 1, further comprising a tubular guide sleeve being slidably disposed around said second guide member to permit sliding of said guide sleeve along said second guide rod.

7. The alignment aid of claim 1, wherein a battery power source is electrically connected to said light source, and wherein said battery power source is disposed in a compartment located at said upper end of said second guide rod below said light source.

8. An alignment aid system for aligning a hitch of a vehicle with a trailer tongue of a trailer, said alignment aid system comprising:
   a vehicle having an upwardly extending ball hitch coupled thereto;
   a trailer having a trailer tongue, said trailer tongue having a downwardly facing receiving socket therein adapted for receiving said ball hitch therein to permit coupling of said trailer to said vehicle;

an alignment aid comprising:
a vehicle mounted assembly and a trailer mounted assembly;
said vehicle mounted assembly comprising:
an adjustably extendable elongate main member having elongate proximal and distal portions;
said distal portion of said main member slidably coupled to said proximal portion of said main member;
an elongate end member having a pair of opposite ends, a lower end of said pair of ends of said end member being coupled to said proximal portion of said main member;
a pair of generally disk shaped vehicle magnets being coupled to said end member and facing away from said main member, one of said vehicle magnets being positioned adjacent said lower end of the end member and another of said vehicle magnets being positioned adjacent an upper end of said pair of ends of said end member;
said vehicle magnet adjacent said upper end of said end member having a larger outer diameter than said vehicle magnet adjacent said lower end of said end member;
said vehicle magnets magnetically coupling said end member to said to said vehicle such that said main member is outwardly extended from said vehicle above said ball hitch of said vehicle;
said distal portion of said main member having a distal end opposite said proximal portion of said main member, said distal end of said distal portion being positioned above said ball hitch of said vehicle;
an elongate first guide rod being upwardly extended substantially perpendicularly from said distal end of said distal portion of said main member;
said first guide rod having opposite upper and lower ends and a longitudinal axis extending between said upper and lower ends of said first guide rod, said lower end of said first guide rod being coupled to said distal end of said distal portion of said main member;
said first guide rod having a resiliently deflectable region adjacent said lower end of said first guide rod to permit resilient deflection of said first guide rod therein;
a bubble vial level indicator being coupled to said main member;
said trailer mounted assembly comprising:
a generally L-shaped upper member having upper and lower ends, and elongate upper and lower portion extending substantially perpendicular to one another;
said upper portion of said upper member being positioned adjacent said upper end of said upper member, and said lower portion of said upper member being positioned adjacent said lower end of said upper member;
a generally L-shaped lower member having elongate top and bottom portions extending substantially perpendicular to one another;
said top portion of said lower member being coupled to said lower end of said upper member;
said upper portion of said upper member being positioned above said bottom portion of said lower member;
said upper portion of said upper member and said bottom portion of said lower member being extended substantially parallel to one another;
an upwardly facing generally disk-shaped trailer magnet being coupled to said bottom portion of said lower member;
a generally dome-shaped center extent upwardly extending from a center region of said trailer magnet
said center extent being inserted into said receiving socket of said trailer tongue of said trailer, said trailer magnet magnetically coupling said bottom portion of said lower member to said trailer tongue of said trailer;
said lower portion of said upper member being positioned in front of said trailer tongue of said trailer and said upper portion of said upper member being positioned above said receiving socket of said trailer tongue of said trailer;
said upper portion of said upper member being located at an elevation with respect to a ground surface below an elevation above the ground surface at which said main member of said vehicle mounted assembly is located;
an elongate second guide rod being upwardly extended substantially perpendicularly from said upper end of said upper member;
said second guide rod having opposite upper and lower ends and a longitudinal axis extending between said upper and lower ends of said second guide rod, said lower end of said second guide rod being coupled to said upper end of said upper member;
said second guide rod having a resiliently deflectable region located adjacent said lower end of said second guide rod to permit resilient deflection of said second guide rod therein;
a tubular generally cylindrical guide sleeve being slidably disposed around said second guide member to permit sliding of said guide sleeve along said second guide rod;
a light source being coupled to said upper end of said second guide rod;
a battery power source being electrically connected to said light source;
said battery power source being disposed in a generally cylindrical compartment located at said upper end of said second guide rod below said light source;
a switch being electrically connected to said light source;
said switch having an elongate actuator downwardly extending from said bottom portion of said lower member; and
said longitudinal axis of said second guide rod, said actuator of said switch, and said center extent being coaxially aligned with one another.

* * * * *